Jan. 6, 1953  G. MAGRATH  2,624,520
BOBBIN CLUTCH
Original Filed Jan. 24, 1946

Inventor
George Magrath
by Roberts, Cushman + Grover
Attys

Patented Jan. 6, 1953

2,624,520

UNITED STATES PATENT OFFICE 2,624,520

BOBBIN CLUTCH

George Magrath, Whitinsville, Mass.

Original application January 24, 1946, Serial No. 643,112, now Patent No. 2,528,066, dated October 31, 1950. Divided and this application July 7, 1950, Serial No. 172,535

2 Claims. (Cl. 242—46.6)

The principal object of the present invention is to provide a bobbin clutch which is of strong and durable construction, having a minimum number of parts, and in which the clutching elements are positively interlocked with the case so as to insure an efficient and reliable action.

Further objects will be apparent from a consideration of the following description and the accompanying drawings, wherein.

In accordance with the present invention I provide a spinning spindle having a blade, a whirl mounted on the blade, the upper face of the whirl having a circular recess concentric with the blade, and a clutching mechanism, the lower part of which is seated in the recess of the whirl. The clutching mechanism comprises the usual case having circumferentially spaced slots through which the clutching fingers of a crown spring project, and either separable from or integral with the lower end of the case is an annular member or circumferential flange seated or fitting within the recess and operative to retain the lower end portions of the case against outward radial movement and also cooperating with the case to provide a positive interlock between the case and clutch spring which prevents relative rotation between these parts.

Figure 1:
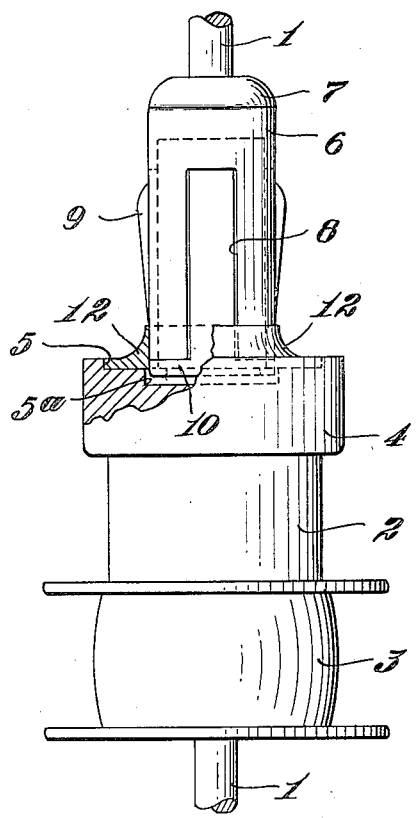
Fig. 1 is an elevation, with parts broken away and shown in section, of a spindle having a bobbin clutch constructed in accordance with the present invention.
Figure 2:
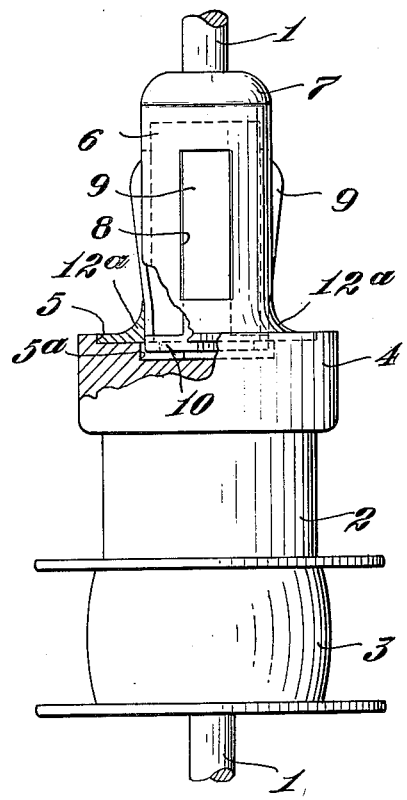
Fig. 2 is a view similar to Fig. 1, but showing a modification.
Figure 3:
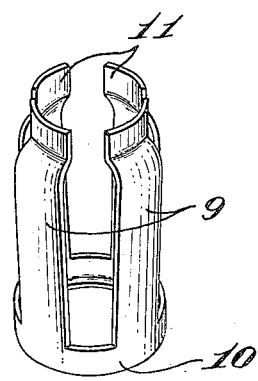
Fig. 3 is a perspective view of the clutching member.

Referring to Figs. 1 and 2, each of the embodiments therein shown comprises a blade I having a whirl 2 mounted thereon, the whirl having a driving member 3 and a cylindrical head 4 formed with a stepped circular recess 5, 5ª concentric with the blade I. A case 6, including an integral head or cap 7, has a pressed fit about the blade I and is formed with a plurality of circumferentially spaced depending segments or fingers defining slots 8 through which the clutching fingers 9 project, it being noted that the lower ends of the segments are spaced from the side and bottom walls of the circular recess to provide clearance spaces for the parts hereinafter described. The clutching fingers 9 are integral with the annular base 10 of the clutch spring (Fig. 3) which, together with the lower end of the segments or fingers of the case 6, is disposed within the inner recess 5ª. The upper ends 11 of the spring fingers 9 are inwardly offset so as to interlock with the walls above the upper part of the slots, the outward flexing movement of the fingers 9 being limited by the engagement of the parts 11 with the upper end of the case.

A circumferential flange or annular retaining member 12 is seated within the outer recess 5, extending about the lower ends of the segments or fingers of the case 6 and base 10, and this member or flange may be separable from the case, as shown in Fig. 1, or integral therewith, as shown at 12ª in Fig. 2. If desired, the flange or member 12, 12ª may be in the form of a conical neck, the lower part of which forms at least a part of the bobbin seat and the upper end of which converges with the lower ends of the case 6 and spring fingers 9 so that accumulations of yarn wound about the clutching members may be forced downwardly about the neck and readily removed as explained more fully in the parent application Serial No. 643,112, filed January 24, 1946, now Patent 2,528,066, granted October 31, 1950, of which this application is a division.

Whether the annular member be separable or integral it acts not only as a retainer preventing outward movement of the lower ends or fingers of the case, relative to the clutching fingers 9 of the spring, but also cooperates with the case in maintaining the positive interlock of the case fingers with the base 10 and lower ends of the clutching fingers 9, which renders relative rotation between the case and clutching spring impossible, it being noted that the lower ends of the case fit between the upstanding fingers 9 and cannot move outwardly because of the confining function of annular member or flange 12.

While I have shown and described different embodiments of the invention it is to be understood that this disclosure is for the purpose of illustration and various modifications and changes may be made without departing from the spirit and scope of the invention as set forth in the appended claims.

I claim:

1. A spindle comprising a blade, a whirl mounted on said blade, said whirl having a cylindrical head, the upper face of said head having a central circular recess, a case extending about said blade and having a head formed with a plurality of circumferentially spaced depending segments projecting into said circular recess with their end portions in spaced relation to its bottom and side walls and defining a plurality of circumferentially spaced slots, an annular member fitting within the space between the lower ends of said segments and the side wall of said annular recess, the lower part of said annular member projecting below the ends of said segments so as to define therewith clearance space below said segments, and a spring member having an annular base and a plurality of resilient clutching fingers integral with and projecting upwardly from said base, said base being disposed within said clearance space beneath the ends of said segments with its clutching fingers projecting upwardly through said slots so as to engage the bore of a bobbin seated on said whirl, said annular member contacting said segments and base so as to prevent outward radial movement of said segments when said spindle is rotating and maintain said case and spring member in interlocked relationship within said circular recess.

2. A bobbin clutch as set forth in claim 1 wherein said annular member is integral with the lower end portions of said segments.

GEORGE MAGRATH.

REFERENCES CITED

The following references are of record in the file of this patent:

UNITED STATES PATENTS

| Number | Name | Date |
|---|---|---|
| Re. 17,964 | Magrath | Feb. 10, 1931 |
| 799,033 | Cunniff | Sept. 12, 1905 |
| 914,742 | Murdock | Mar. 9, 1909 |
| 1,406,975 | Chapman | Feb. 21, 1922 |
| 1,777,236 | Swanson | Sept. 30, 1930 |
| 1,834,914 | Goff | Dec. 1, 1931 |
| 2,030,301 | Jackson | Feb. 11, 1936 |
| 2,249,150 | Magrath | July 15, 1941 |
| 2,471,574 | Magrath | May 31, 1949 |

FOREIGN PATENTS

| Number | Country | Date |
|---|---|---|
| 338,300 | France | Mar. 16, 1904 |
| 29,042 | Great Britain | Dec. 23, 1911 |